United States Patent [19]

Lyle et al.

[11] Patent Number: 4,484,036

[45] Date of Patent: Nov. 20, 1984

[54] TELEPHONE RING DETECTOR SYSTEM

[75] Inventors: Stephen V. Lyle, San Pedro; Bradford E. Hanscom, Downey, both of Calif.

[73] Assignee: T.A.D. Avanti, Inc., Compton, Calif.

[21] Appl. No.: 485,840

[22] Filed: Apr. 18, 1983

Related U.S. Application Data

[63] Continuation of Ser. No. 265,023, May 18, 1981, abandoned.

[51] Int. Cl.³ .......................... H04M 3/02; H04Q 9/00
[52] U.S. Cl. .............................. 179/84 A; 179/84 R; 179/6.16
[58] Field of Search ............... 179/84 R, 84 T, 84 A, 179/6.16

[56] References Cited

U.S. PATENT DOCUMENTS 3,899,644  8/1975  Hunt ............................. 179/84 R X
4,074,081  2/1978  Humm ............................. 179/84 R

OTHER PUBLICATIONS

Edward Noll, *FET Principles, Experiments, and Projects*, 1975, pp. 252–255.

*Primary Examiner*—Gene Z. Rubinson
*Assistant Examiner*—James L. Dwyer
*Attorney, Agent, or Firm*—Keith D. Beecher

[57] ABSTRACT

A telephone ring detector system which finds particular utility in a telephone answering unit, since it responds only to ring signals on the telephone line to activate the system, and it is unresponsive to dialing pulses which would otherwise cause a spurious activation of the telephone answering unit. The system of the invention differentiates the ring signals from dialing pulses by detecting whether or not the telephone line to which the telephone answering unit is connected is in an "on-hook" or "off-hook" hook condition, and by providing an output in response to an incoming signal only when the telephone is in the "on-hook" condition. This assures that the signal detected on the telephone line is not a series of dialing pulses, since the dialing pulses occur only when the telephone line is in the "off-hook" condition. The system of the invention has the feature in that it is effectively direct-current isolated from the telephone line in accordance with the requirements of the Federal Communications Commission. The system of the invention also has the capability of sensing positive or negative voltage deviations when the receiver is taken off the hook, so as to be effective with all types of telephone systems. The system has the added capability of sensing true ring signals outside the normal frequency range and which would be rejected by many prior art systems.

5 Claims, 1 Drawing Figure

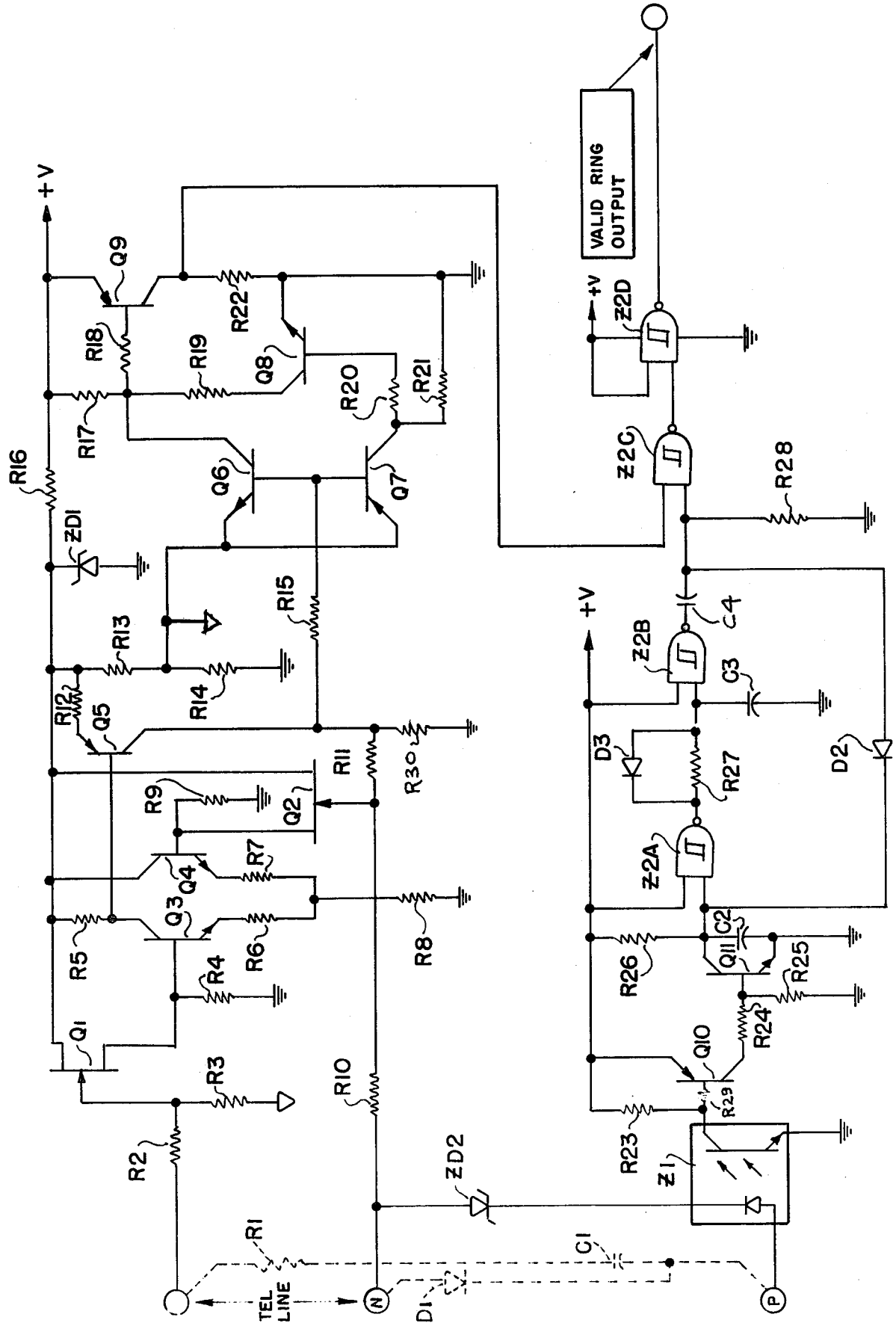

TELEPHONE RING DETECTOR SYSTEM

This application is a continuation of Copending application Ser. No. 265,023 filed May 18, 1981 now abandoned.

BACKGROUND OF THE INVENTION

Telephone answering units are presently available which respond to ring signals received over the telephone line to be activated so that a recorded announcement may be transmitted over the telephone line to the calling party, and so that a message from the calling party may subsequently be recorded.

However, problems have arisen in the past in making such telephone answering units unresponsive to dialing pulses from the associated telephone, so that the unit will not respond to such pulses when the subscriber is dialing his telephone. For example, often when a person is dialing his telephone, the usual prior art telephone answering unit has a tendency to respond to the dialing pulses, mistaking them for ring signals, and causing the system to come on to the telephone line and break the outgoing dialing pulses so that the outgoing call cannot be completed.

Systems have been proposed in the past which distinguish between dialing pulses and ring signals by sensing whether or not the associated telephone is in an "on-hook" or "off-hook" condition. For example, such systems are described in U.S. Pat. Nos. 3,899,644 and 4,074,081. However, such systems are not acceptable in conjunction with present-day telephones, because of the requirement by the Federal Communications Commission that telephone answering systems be direct-current isolated from the telephone line, and such prior art systems require a direct current coupling to the telephone line, with substantial loading of the line.

Also, in some telephone systems, the direct-current voltage level of the line increases when the receiver is taken off the hook, and in other telephone systems the direct-current level decreases, so that, for commercial practicability, it is essential that the system respond both to voltage increases or voltage decreases to perform its function. The system of the present invention is constructed to respond both to voltage increases or voltage decreases on the telephone line to detect whether the associated telephone is in an "on-hook" or "off-hook" condition.

The system of the present invention, accordingly, has utility in conjunction with telephone answering units. However, it will become evident as the description proceeds that the system of the invention is not limited to such a use, but finds finds utility in conjunction with a number of systems in which incoming signals are to be distinguished, and only one type of incoming signal is to be recognized and detected.

Distinguishing between ring signals and dial pulses on the telephone line has presented a problem in the prior art systems because the ringing signals and dial pulses closely resemble one another. The ringing signal is typically a high voltage wave, which may be either square or sinusoidal in shape, with an amplitude of approximately 40–100 volts RMS, or approximately 113–282 volts peak-to-peak; and of a frequency which may range from 16 Hz to 67 Hz. The dial pulses, on the other hand, typically produce a waveform which is relatively square in shape with a maximum amplitude of approximately 100 volts peak-to-peak, and a frequency which may be within the range of normal ringing frequencies.

It is therefore, virtually impossible to differentiate between the ring signals and the dialing pulses on the telephone line on the basis of frequency or wave shape, since both may be the same. It is also virtually impossible to differentiate between the ring signals and dialing pulses on the basis of voltage amplitudes since these voltages have no established relationship, and usually are of substantially the same amplitude. Also, systems which attempt to differentiate between ring signals and dialing pulses by counting the pulses or bursts are unreliable, since these may vary from one telephone system to another.

As explained above, the system of the present invention provides a positive means for differentiating between ring signals and dialing pulses, by detecting whether or not the associated telephone line is in an on-hook or off-hook condition, and by producing a detected output only when the telephone line is in the on-hook condition, indicating that the detected signal is actually a ring signal and not dialing pulses.

BRIEF DESCRIPTION OF THE DRAWING

The single FIGURE is a circuit diagram of a presently preferred embodiment of the ring detector system of the invention.

DETAILED DESCRIPTION OF THE ILLUSTRATED EMBODIMENT

In the system illustrated in the drawing, the telephone line is connected through a 22 megohm isolation resistor R2 to the gate electrode of a field effect transistor Q1, and through a 680 ohm resistor R3 to chassis ground. The source electrode of the field effect transistor Q1 is connected to the base of an NPN transistor Q3 and to a grounded 47 kilo-ohm resistor R4. The emitter of transistor Q3 is connected through a 100 ohm resistor R6 to a grounded 8.2 kilo-ohm resistor R8. The drain electrode of field effect transistor Q1 is connected through a 330 ohm resistor R16 to the positive terminal +V of a unidirectional potential source, and the collector of transistor Q3 is connected through a 5.1 kilo-ohm resistor R5 to resistor 16. The collector of transistor Q3 is directly connected to the base of a PNP transistor Q5. A transistor Q4 has its collector directly connected to resistor 16, and transistor Q4 has its emitter connected through a 100 ohm resistor R7 to a grounded resistor R8. Transistors Q3 and Q4 are NPN transistors which may be of the type designated 2SC945, whereas field effect transistor Q1, and a further field effect transistor Q2, may each be of the type designated 2SK68A.

The base of transistor Q4 is connected to a grounded 4.7 kilo-ohm resistor R9 and to the source electrode of a field effect transistor Q2. A second terminal of the telephone line designated N is connected through a 22 megohm isolation resistor R10 to the gate electrode of field effect transistor Q2, and through a 680 kilo-ohm resistor R11 to the collector of transistor Q5 and to a grounded 1 kilo-ohm resistor R30. Transistor Q5 may be of the type designated 2SA733. The emitter of transistor Q5 is connected through a 100 ohm resistor R12 to resistor R16, and is connected to a 1 kilo-ohm resistor R13. The emitters of a pair of NPN transistors Q6 and Q7 are connected to resistor R13 and to a grounded resistor R14 having a value of 1 kilo-ohm. The junction of R13 and R14 is connected to chassis ground. The collector of transistor Q5 is connected through a 47 kilo-ohm resistor R15 to the base electrodes of transistors Q6 and Q7. Transistors Q6 and Q7 are NPN transistors, and may be of the type designated 2SC945. A grounded Zener diode ZD1 is also connected to resistor R16.

The collector of transistor Q6 is connected through a 47 kilo-ohm resistor R17 to the terminal +V, and through a 47 kilo-ohm resistor R18 to the base of a PNP transistor Q9; and through a 47 kilo-ohm resistor R19 to the collector of an NPN transistor Q8. Transistor Q9 may be of the type designated 2SA733, and transistor Q8 may be of the type designated 2SC945. The emitter of transistor Q9 is connected directly to the terminal +V, and the collector is connected to a grounded 10 kilo-ohm resistor R22. The emitter of transistor Q8 is grounded. The collector of transistor Q7 is connected through a 47 kilo-ohm resistor R20 to the base of transistor Q8, and to a grounded 47 1N4148. The other input terminal of "nand" gate Z2C is connected to the collector of transistor Q9. The output terminal of the "nand" gate is connected to the input of gate Z2D, whose other input is connected to the +V terminal, and whose output is connected to the output of the system to produce an output only when a valid ring signal is detected.

As explained above, the basic concept of the system illustrated in the drawing is to determine whether or not a signal received on the telephone line represents a valid ring signal, or some extraneous signal, such as dialing pulses. As also explained, to accomplish the distinction, it is necessary to know whether or not the associated telephone is in an on-hook condition or off-hook condition, since the valid ring signals occur only when the telephone is in the on-hook condition. When the telephone changes from an on-hook condition to an off-hook condition, the voltage on the telephone line drops from approximately 50 volts to something less than 10 volts, typically between 5 and 8 volts. Hence, a system that recognizes the on-hook condition can utilize that condition as a means of determining whether or not the signals received by the system represent valid ring signals.

There are two basic sections to the ring detector system illustrated in the drawing. The upper section monitors or senses the direct current voltages on the telephone line and introduces a signal representing the direct current state of the telephone line to the second section of the system. The second section is a decision making system which decides whether or not the signals received over the telephone line represent valid ring signals.

The scope of the lower section of the circuit is to examine any AC voltages appearing on the telephone line. If any AC voltage burst is within the frequency and voltage limitations of the circuit (greater than 10 Hz and greater than 6 VRMS), the burst will be sensed. In order to eliminate false triggering from such events as taking the telephone off-hook or placing it on-hook, the circuit requires that the burst be at least 300 milliseconds long. If the burst is indeed 300 milliseconds, or greater, in length, the circuit will cause the DC voltage on the telephone line to be measured 100 milliseconds after the end of the AC burst. If the DC voltage indicates that the telephone line is in an on-hook condition, the circuit will deliver a 1 second long output pulse.

As explained above, due to the requirements of the Federal Communications Commission regarding direct current isolation from the telephone line of any ancillary equipment, the telephone line direct current voltage is monitored by the system of the present invention through 22 megohm isolation resistors R2 and R10. This provides very little current to be sensed by the system, necessitating the use of a field effect transistor (FET) input differential operational amplifier which comprises the circuitry of FET's Q1 and Q2, NPN transistors Q3 and Q4, and PNP transistor Q5. The differential operational amplifier is configured in a differential input mode to insure responses only to signals present on the telephone line, and to insure high rejection of unwanted common-mode signals such as extraneous AC fields and noise. Transistors Q6–Q9, as will be described, form an absolute value sensing circuit. This concept of using an absolute value sensing circuit after the isolation resistors R2 and R10 insures that any failure of the circuit will not cause the telephone line to become inoperative.

The isolation resistors R2 and R10 form a voltage divider with resistors R3 and R11 to provide a voltage division of approximately 32.35:1. A normal line in the on-hook condition thus develops approximately 1.5 volts across resistors R3 and R11. In the off-hook condition, this voltage would be less than 0.3 volts.

Transistors Q3 and Q4 are NPN bi-polar devices, and they form a differential input pair. The FET's Q1 and Q2 buffer the input signals to the differential pair. The use of FET's Q1 and Q2 only as buffers insures that the variations in the characteristics of the FET's will have minimal effect on the performance of the system. The signal appearing across resistor R5 is applied to the base of transistor Q5, and the voltage appearing across resistor R30 is the output of the operational amplifier. Resistor R30 is a pull-down resistor which acts as a 3.75 milliampere current source for transistor Q5, and which provides passive pull-down for swings in the negative direction. Resistor R11, which functions are part of the input voltage divider, is connected to the collector of transistor Q5 to insure unity gain for the operational amplifier.

A 1.5 volt signal on the input FET Q1 is thus reflected as a 1.5 volt signal on the output of the differential amplifier at the collector of transistor Q5, rereferenced to a derived one-half ZD1 reference point formed by resistors R13 and R14. This derived reference is necessary to allow the differential amplifier to swing negatively as well as positively with a single-ended supply.

The output of the differential amplifier is fed through isolating resistor R15 to the base electrodes of transistors Q6 and Q7 which are connected as a transistor switch. The transistor switch turns on when the absolute value of the output of the differential amplifier exceeds the VBE drop of Q6 for positive excursions, or the $V_{BE}$ drop of Q7 for negative excursions. These $V_{BE}$ drops are typically 0–6 volts with respect to the derived one-half ZD1 reference. Response of the transistor switch to the absolute value of the differential amplifier output is necessary to insure that the system will function regardless of the polarity of the direct current differential on the line between the on-hook and off-hook condition.

For a positive-going transition in direct current voltage on the telephone line in excess of the typical 0.6 volt threshold, transistor Q6 is rendered conductive, which causes transistor Q9 to become conductive. For negative-going transitions of the direct current voltage on the telephone line, transistor Q7 is rendered conductive, causing transistor Q8 to become conductive which, in turn, causes transistor Q9 to become conductive. The output of the direct current sensing section of the system appears across resistor R22 which is a passive pull-down resistor for the transistor Q9 which is the output transistor for the transistor switch. Therefore, when transistor Q9 is rendered conductive, it causes the connection to "nand" gate Z2C to rise to +V voltage. For the off-hook condition, the transistor switch of transistors Q6 and Q7 remains turned off, and resistor R22 pulls the output to ground. Therefore, the "nand" gate Z2C is enabled only during the on-hook condition of the associated telephone.

Accordingly, the 0.6 volt switch threshold translated back through the unity gain input operational amplifier corresponds to 0.6 volts on the gates of the input FET's Q1 and Q2. Translating this back through the passive input divider ratio of 32.35:1 corresponds to 19.4 volts on the telephone line. Therefore, for telephone line direct current voltage levels in excess of ±19.4 volts, the direct current connection to the "nand" gate Z2C will be high, rising to +V; and for telephone line DC levels less than ±19.4 volts, the connection to the "nand" gate will be low, at ground potential. Therefore, as stated above, the "nand" gate Z2C will be enabled whenever the telephone line direct current level is in excess of ±19.4 volts, indicating an on-hook condition.

The characteristics of the optical coupling unit Z1 are such that it will only pass signals of an amplitude greater than 6 volts RMS, and of a frequency greater than 10 Hz. When a ring signal of at least 6 volts RMS, and of a frequency greater than 10 Hz appears on the telephone line, the optical coupling unit Z1 will cause transistor Q10 to become conductive, and will also cause transistor Q11 to become conductive to reset a 100 millisecond signal-duration timer circuit formed by resistor R26 and capacitor C2. At this time, "nand" gate Z2A is non-conductive, so that its output is high, charging capacitor C3 through resistor R27. If the ring signal is present for at least 300 milliseconds, capacitor C2 will charge to a predetermined voltage threshold and "nand" gate Z2B will become conductive, causing its output to go low. At the end of the ring signal, the timer circuit formed by capacitor C4 and resistor R28 will be activated, after time-out of the 100 millisecond timer circuit R26, C2. Then, if the "nand" gate Z2C is enabled at this time by the upper section of the system, a valid ring output will appear at the output of gate Z2D. This output will remain for 1 second, a time interval established by timer circuit C4, R28, which represents the time required for capacitor C4 to discharge through resistor R28, unless there is another ring signal on the telephone line during the 1-second interval, and then the pulse will be terminated by the action of diode D2 and transistor Q11 due to the immediate discharge of capacitor C4. On the other hand, if the associated telephone is in an off-hook condition when a signal appears on the telephone line, the "nand" gate Z2C will be disabled, and no output will appear at the output terminal of the gate Z2D.

The invention provides, therefore, an improved solid state system for detecting valid ring signals on the telephone line, and which is constructed to be isolated from the telephone line so that no direct current load is placed on the telephone line, and which also is connected to respond to negative or positive voltage differentials when the associated telephone is in an on-hook condition, as compared with an off-hook condition.

What is claimed is:

1. A ring detector system for use in a telephone answering machine for detecting ring signals on the telephone line and for being unresponsive to dialing pulses, said telephone answering machine being used in conjunction with a telephone connected to the telephone line, said telephone line having first, second and third terminals, and in which a particular direct current voltage appears across the first and second terminals for the on-hook condition of the telephone and a different direct current voltage appears cross the first and second terminals for the off-hook condition of the telephone, said ring detector system including: a first section connected across the first and second terminals of the telephone line for sensing the direct current voltage on the telephone line and for producing an output only when the telephone is in an on-hook condition; a second section connected across the second and third terminals of the telephone line and responsive to alternating current ring signals on the telephone line for producing an output in response to such ring signals and being unresponsive to other alternating current signals on the telephone line; and an output circuit connected to the first and second sections and responsive to the two outputs from the first and second sections for producing an output; said first section including an operational amplifier having a differential mode field effect transistor input circuit which further includes first and second direct-current isolating resistors respectively connecting the input circuit of the operational amplifier to said first and second terminals of the telephone line; and said second section including signal-duration timing circuitry for enabling the second section to produce an output only in response to alternating current signals on the telephone line in excess of a particular minimum duration, and further circuitry coupling the second section to the second and third terminals of the telephone line for passing only alternating current signals from the telephone line to the second section which are in excess of a particular minimum frequency and voltage.

2. The ring detector system defined in claim 1, and in which said further circuitry coupling the second section to the second and third terminals of the telephone line comprises an optical coupling unit.

3. The ring detector system defined in claim 1, in which said first section includes an absolute value sensing circuit connected to the output of the operational amplifier for causing said first section to produce said output regardless of whether the off-hook voltage on the telephone line is positive or negative with respect to the on-hook voltage.

4. The ring detector system defined in claim 1, in which said second section includes further timing circuitry for causing the output from the second section to continue for a predetermined duration after the termination of the ring signal on the telephone line.

5. The ring detector system defined in claim 4, and which includes further circuitry for terminating the output from the second section should a second ring signal appear on the telephone line within the time of duration of said output.

* * * * *